Patented Sept. 24, 1946

2,407,988

UNITED STATES PATENT OFFICE 2,407,988

PROCESS FOR TREATING CELLULOSE MATTER WITH TERPENE DIHYDROCHLORIDE

Christopher Luckhaupt, Jamaica, N. Y., assignor to Luckite Processes, Inc., Delawanna, N. J., a corporation of New Jersey No Drawing. Application February 14, 1942, Serial No. 430,944

1 Claim. (Cl. 117—143)

This invention relates to a method of processing porous cellulosic materials and to the resulting product.

One of the objects of my invention is the provision of a process whereby porous cellulosic materials may be treated to increase or enhance the tensile strength, flexural strength and compressional strength thereof. Provision is made also in the present invention for the incorporation in the base treating material of certain substances to be hereinafter referred to as "fortifiers" whereby the properties imparted to the porous cellulosic material by the base material are further enhanced and other properties incorporated.

More specifically the present invention provides for the processing of porous cellulosic and kindred material whereby the same becomes waterproof, flameproof, oilproof and rotproof. I am also able to impart hardness, strength and elasticity to the cellulosic material and to convert the same as well into a good electrical insulating material meeting all the requirements of the fire underwriters.

Still more specifically the present invention provides for the treatment of porous cellulosic material and kindred material with terpene dihydrochloride $C_{10}H_{16}.2HCl$. This material is made from limonene ($C_{10}H_{16}$) in glacial acetic acid by HCl gas or from terpin and HCl gas. It is a white to yellowish white crystal melting at 50° C. (122° F.). It is insoluble in water and is practically odorless and tasteless. The cellulosic material may be immersed in a hot bath of the terpene dihydrochloride in an open container, the employment of vacuum or pressure being unnecessary to the successful practice of my invention. The terpene dihydrochloride during processing is kept at its melting temperature or higher. The period of immersion is dependent, of course, upon the degree of penetration desired, but in any event is only a matter of seconds.

My invention may be practiced by spraying or by coating in an ordinary roller coating machine.

I find that terpene dihydrochloride is particularly advantageous when treating porous cellulosic material containing low melting point materials which are to be preserved, in that the terpene dihydrochloride has a low melting point. This fact too is of material advantage where flexibility of the processed material is to be preserved, cellulosic material processed with terpene dihydrochloride remaining flexible at low temperatures.

My base material, terpene dihydrochloride, is practically odorless and tasteless, and for this reason is well fitted for treating containers for packing foodstuffs.

While the use of terpene dihydrochloride is of material advantage in many respects other than those above referred to, I might mention that preformed articles of porous cellulosic material may be treated without warping, swelling or otherwise distorting the preformed article.

While terpene dihydrochloride in itself, as above pointed out, is insoluble in water, the waterproofness of a cellulose material processed with this base material may be further increased by adding fortifiers such as vegetable oils and mineral oils, raw and blown, fatty acids, cetyl alcohol, etc. These fortifiers are added to the heated terpene dihydrochloride.

The cellulose being processed may be rendered highly flameproof and fire-resistant by adding to the melted dihydrochloride fortifiers such as acetic acid, citric acid, butyl phosphate, cholesterol, etc.

It is sometimes desirable to prevent the oxidation of the material processed and to prevent it from drying out and becoming brittle, and in such event I add fortifiers such as parachlorophenol, diethyl phthalate, dimethyl phthalate, castor oil, etc. to the melted terpene dihydrochloride.

The oilproofness of the processed material may be enhanced by the incorporation into the melted terpene dihydrochloride of fortifiers such as cellulose acetate, glycerophosphate, etc.

Cellulose acetate also possesses the property of increasing the hardness and strength of a cellulosic material processed in accordance with my invention. Fortifiers such as resin, indene resin, etc. may be used also to increase the hardness of the resulting product, while ethyl cellulose and butyl cellulose are further examples of fortifiers useful in increasing the strength of the resulting product.

Where an increase in adhesiveness is desired, fortifiers such as resin, indene resin, linseed oil, rape seed oil, etc. may be used.

The cellulosic material being processed may be rendered rot-proof by the use of fortifiers such as sodium fluoride, dinitrophenol cromate, etc., while the elasticity of the finished product is much enhanced by the incorporation of vegetable and mineral oils.

Marked improvement is obtained in the insulation value of the processed cellulosic material and an article produced capable of meeting the fire underwriters' requirements by adding fortifiers such as chlorinated waxes, latex, cellulose acetate and ethyl cellulose to the hot terpene dihydrochloride.

I find that articles of porous cellulosic material processed in accordance with this invention have their pores and interstices filled with the treating material in solid form, leaving a smooth surface on the processed material. This surface need only be sanded to fit the same for painting, shellacking, varnishing, etc., if such finishes are desired. Should it be desired to coat as well as to impregnate the cellulosic material, this can be done by lowering the temperature of the treating material after initial processing.

Porous cellulosic material and kindred materials treated in accordance with this invention may be sawed, bored, planed and shaped without jagged edges or jagged surfaces and without cracking or checking of the material.

As above pointed out, the processing period varies with the degree of penetration desired. As a general rule the processing period depends upon the temperature of the treating material and the degree of penetration desired. In all cases, however, impregnation is almost instantaneous, being only a matter of a few seconds.

I think it will be appreciated that it is not possible to name a specific amount of a given fortifier which must be employed in all cases. The ratio of fortifier to terpene dihydrochloride necessarily varies over a wide range, and is dependent upon the degree to which a particular characteristic is to be imparted to the material being processed. I have found from a great many tests that the fortifiers may vary in quantity from 2 to 75% by weight of the terpene dihydrochloride. As a general rule the more fortifier employed the greater the degree of the characteristic or property of that particular fortifier imparted to the cellulosic material or kindred material being processed.

It is to be understood that cellulose sheets, for example, may be processed and afterward fabricated into any article desired, although, as above mentioned, there is no change, shrinking or swelling or warping of preformed articles processed in accordance with my invention.

The terpene dihydrochloride and fortifiers can be added to comminuted cellulosic material so that the admixture may be employed as a moulding powder. If a thermoplastic is desired then fortifiers such as cellulose acetate and triphenyl phosphate may be used. If the powder is to be thermo-setting then I suggest latex and sulphur.

While I have described my invention with refrenece to certain fortifiers, etc., it is to be understood that changes and modifications may be made within the purview of my invention.

What I claim is:

The method which comprises impregnating porous cellulosic material by immersing the same in a mixture of terpene dihydrochloride and cellulose acetate heated to a temperature at or above the melting temperature of the terpene dihydrochloride.

CHRISTOPHER LUCKHAUPT.